United States Patent [19]
Dent et al.

[11] Patent Number: 5,572,552
[45] Date of Patent: Nov. 5, 1996

[54] METHOD AND SYSTEM FOR DEMODULATION OF DOWNLINK CDMA SIGNALS

[75] Inventors: Paul W. Dent, Stehags, Sweden; Gregory E. Bottomley, Cary, N.C.

[73] Assignee: Ericsson GE Mobile Communications Inc., Research Triangle Park, N.C.

[21] Appl. No.: 187,062

[22] Filed: Jan. 27, 1994

[51] Int. Cl.$^6$ .................... H03D 1/00; H04B 1/10
[52] U.S. Cl. .................... 375/343; 375/350; 375/324; 455/213; 455/307
[58] Field of Search .................... 375/229, 230, 375/231, 232, 233, 324, 325, 263, 200, 340, 343, 349, 350; 370/20, 19, 18, 21, 22; 455/213, 222, 226.3, 296, 307; H03D 1/00

[56] References Cited

U.S. PATENT DOCUMENTS

| | | | |
|---|---|---|---|
| 4,709,374 | 11/1987 | Farrow | 375/13 |
| 4,761,796 | 8/1988 | Dunn et al. | 375/1 |
| 4,972,433 | 11/1990 | Yamaguchi et al. | 375/12 |
| 5,010,333 | 4/1991 | Gardner et al. | 340/856 |
| 5,048,059 | 9/1991 | Dent | 375/94 |
| 5,127,051 | 6/1992 | Chan et al. | 380/49 |
| 5,218,619 | 6/1993 | Dent | 375/1 |
| 5,237,586 | 8/1993 | Bottomley | 375/1 |
| 5,268,930 | 12/1993 | Sendyk et al. | 375/13 |
| 5,305,349 | 4/1994 | Dent | 375/1 |
| 5,311,545 | 5/1994 | Critchlow | 375/14 |
| 5,353,352 | 10/1994 | Dent et al. | 380/37 |
| 5,361,276 | 11/1994 | Subramanian | 375/1 |
| 5,499,272 | 3/1996 | Bottomley | 375/347 |
| 5,506,861 | 4/1996 | Bottomley | 375/200 |

OTHER PUBLICATIONS

M. Abdulrahman et al., "Equalization for Interference Cancellation in Spread Spectrum Multiple Access Systems", *VTC '92* (1992).

Alexandra Duel–Hallen, "Equalizers for Multiple Input/Multiple Output Channels and PAM Systems with Cyclostationary Input Sequences", *IEEE Journal on Selected Areas in Communications*, vol. 10, No. 3, pp. 630–639 (Apr. 1992).

Majeed Abdulrahman et al., "Cyclostationary Crosstalk Suppression by Decision Feedback Equalization on Digital Subscriber Loops", *IEEE Journal on Selected Areas in Communications*, vol. 10, No. 3, pp. 640–649 (Apr. 1992).

Per K. Enge et al., "Spread–Spectrum Multiple–Access Performance of Orthogonal Codes: Linear Receivers", *IEEE Transactions on Communications*, vol. Com–35, No. 12, pp. 1309–1319 (Dec. 1987).

Michael L. Honig et al, "Suppression of Near–and Far–End Crosstalk by Linear Pre– and Post–Filtering", *IEEE Journal on Selected Areas in Communications*, vol. 10, No. 3, pp. 614–629 (Apr. 1992).

Andrew B. Martinez et al., "Finite Length Discrete Matched Filters", *Journal of the Franklin Institute*, vol. 321, No. 5, pp. 251–260 (1986).

J. E. Mazo, "Exact Matched Filter Bound for Two–Beam Rayleigh Fading", *IEEE Transactions on Communications*, vol. 39, pp. 1027–1033 (Jul. 1991).

(List continued on next page.)

*Primary Examiner*—Kim Yen Vu
*Assistant Examiner*—Madeleine Anh-Vinh Nguyen
*Attorney, Agent, or Firm*—Burns, Doane, Swecker & Mathis, L.L.P.

[57] ABSTRACT

Demodulation of a CDMA downlink signal is performed by filtering correlations of the received signal with a known signature sequence. Unlike the conventional RAKE receiver, the filtering is not necessarily a FIR filter with coefficients equal to the conjugates of channel tap estimates. Instead, the present invention filters in such a way as to maximize the output signal-to-noise ratio, accounting for the fact that part of the noise comes from the same base station as the signal, so that it is colored by the same channel as the signal.

29 Claims, 6 Drawing Sheets

OTHER PUBLICATIONS

Raymond L. Pickholtz et al., "Theory of Spread–Spectrum Communications—A Tutorial", *IEEE Transactions on Communications*, vol. COM–30, No. 5, pp. 855–884 (May 1982).

R. Price et al., "A Communication Technique for Multipath Channels", *Proceedings of The IRE*, vol. 46, pp. 555–570 (Mar. 1958).

Donald L. Schilling et al., "Spread Spectrum for Commercial Communications", *IEEE Communications Magazine*, vol. 29, pp. 66–79 (Apr. 1991).

George L. Turin, "An Introduction to Matched Filters", *IRE Transactions on Information Theory*, vol. IT–6, pp. 311–329 (Jun. 1960).

George L. Turin, "The Effects of Multipath and Fading on the Performance of Direct–Sequence CDMA Systems", *IEEE Transactions on Vehicular Technology*, vol. VT–33, No. 3, pp. 213–219 (Aug. 1984).

George L. Turin, "Introduction to Spread–Spectrum Antimultipath Techniques and Their Application to Urban Digital Radio", *Proceedings of the IEEE*, vol. 68, No. 3, pp. 328–353 (Mar. 1980).

Kung Yao, "Error Probability of Asynchronous Spread Spectrum Multiple Access Communication Systems", *IEEE Transactions on Communications*, vol. COM–25, No. 8, pp. 803–809 (Aug. 1977).

METHOD AND SYSTEM FOR DEMODULATION OF DOWNLINK CDMA SIGNALS

BACKGROUND

The present invention generally relates to Code Division Multiple Access (CDMA) communications techniques in radio telephone communication systems and, more particularly, to the demodulation of CDMA signals.

CDMA and spread spectrum communications have been around since the days of World War II. Early applications were predominantly military oriented. However, today there has been an increasing interest in using spread spectrum systems in commercial applications, including digital cellular radio, land mobile radio, and indoor and outdoor personal communication networks.

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation cellular technology. Furthermore, it is widely believed that the first generation of Personal Communication Networks (PCNs), employing low cost, pocket-size, cordless telephones that can be carried comfortably and used to make or receive calls in the home, office, street, car, etc., will be provided by cellular carriers using the next generation digital cellular system infrastructure. The key feature demanded in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. System capacity is limited by the available frequencies as well as by limitations imposed by channel reuse. In TDMA systems, a channel consists of a time slot in a periodic train of time intervals over the same frequency. System capacity is limited by the available time slots as well as by limitations imposed on channel reuse.

With FDMA or TDMA or hybrid FDMA/TDMA systems, the goal is to ensure that two potentially interfering signals do not occupy the same frequency at the same time. In contrast, Code Division Multiple Access (CDMA) allows signals to overlap in both time and frequency. Thus, all CDMA signals share the same frequency spectrum. In the frequency or the time domain, the multiple access signals appear to overlap one another.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every cell. CDMA transmission of voice by a high bit rate decoder ensures superior, realistic voice quality. CDMA also provides for variable data rates allowing many different grades of voice quality to be offered. The scrambled signal format of CDMA completely eliminates cross talk and makes it very difficult and costly to eavesdrop or track calls, ensuring greater privacy for callers and greater immunity from air time fraud.

In a "traditional" direct-sequence CDMA system, the informational data stream to be transmitted is impressed upon a much higher rate data stream known as a signature sequence to generate a transmitted sequence. The informational data stream and the high bit rate signature sequence stream are combined by effectively multiplying the two bit streams together, assuming the binary values of the two bit streams are represented by +1 or −1. The informational data stream may consist of M'ary complex symbol values instead of binary +1 or −1 values. This combination of the higher bit rate signal with the lower bit rate data stream is called coding or spreading the informational data stream signal. Each informational data stream or channel is allocated a unique signature sequence.

Typically, the signature sequence data are binary, giving rise to stream of bits referred to as "chips." One way to generate this signature sequence is with a pseudo-noise (PN) process that appears random, but can be replicated by an authorized receiver. It is common for the period of the signature sequence to occupy one data symbol period, so that each data symbol is spread by the same Nc-chip signature sequence. In general, this signature sequence may be represented by real and imaginary numbers, corresponding to sending a chip value on the carrier frequency (I channel) or on a 90-degree shifted version of the carrier frequency (Q channel). Also, the signature sequence may be a composite of two sequences, where one of these sequences is a Walsh-Hadamard code word.

Typically the data symbols are binary. Thus, transmission of the signature sequence or its inverse represents one bit of information. In general, to send information symbol b using signature sequence s(n), one transmits $$t(n)=b\,s(n) \tag{1}$$

The receiver correlates the received signal with the known signature sequence to produce a detection statistic, which is used to detect b. For binary information symbols, when a large positive correlation results, a "0" is detected; when a large negative correlation results, a "1" is detected.

A plurality of coded information signals modulate a radio frequency carrier, for example by phase shift keying (PSK), and are jointly received as a composite signal at the receiver. Each of the spread signals overlaps all of the other spread signals, as well as noise-related signals, in both frequency and time. If the receiver is authorized, then the composite signal is correlated with one of the unique signature sequences, and the corresponding information signal can be isolated and decoded.

In the above example, a dam symbol b directly modulates a signature sequence s(n), which is commonly referred to as coherent modulation. The data symbol can be binary (+1 or −1), quaternary (+1, +j, −1, −j), or, in general, M'ary, taking on any of M possible values. This allows $\log_2(M)$ information bits to be represented by one information symbol b. In another traditional CDMA modulation scheme, the information is contained in how b changes from one symbol to the next, this being referred to as differentially coherent modulation. In this case, the true information is usually given by b(t) b*(t−Ts), where * denotes complex conjugation, t is a time index, and Ts is the information symbol period. In yet another traditional CDMA modulation scheme, sometimes referred to as noncoherent modulation, an M'ary information symbol is conveyed by transmitting one of M different signature sequences.

Another CDMA technique, called "enhanced CDMA", also allows each transmitted sequence to represent more than one bit of information. A set of code words, typically orthogonal code words or bi-orthogonal code words, is used to code a group of information bits into a much longer code sequence or code symbol. A signature sequence is used to scramble the binary code sequence before transmission. This can be done by modulo-2 addition of the two binary sequences. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code. Enhanced CDMA can be viewed as a special case of noncoherent modulation.

In both traditional and enhanced CDMA, the "information bits" or "information symbols" referred to above can also be coded bits or symbols, where the code used is a block or convolutional code. One or more information bits can form a data symbol. Also, the signature sequence or scramble mask can be much longer than a single code sequence, in which case a subsequence of the signature sequence or scramble mask is added to the code sequence.

In many radio communication systems, the received signal includes two components: an I (in-phase) component and a Q (quadrature) component. This results because the transmitted signal has two components, and/or the intervening channel or lack of coherent carrier reference causes the transmitted signal to be divided into I and Q components. In a typical receiver using digital signal processing, the received I and Q component signals are sampled every Tc seconds, where Tc is the duration of a chip, and stored.

In mobile communication systems, signals transmitted between base and mobile stations typically suffer from echo distortion or time dispersion, caused by, for example, signal reflections from large buildings or nearby mountain ranges. Multipath dispersion occurs when a signal proceeds to the receiver along not one but many paths so that the receiver receives many echoes having different and randomly varying delays and amplitudes. Thus, when multipath time dispersion is present in a CDMA system, the receiver receives a composite signal of multiple versions of the transmitted symbol that have propagated along different paths (referred to as "rays") usually having relative time delays of less than one symbol period. Each distinguishable ray has a certain time of arrival k Tc seconds relative to the arrival of the first ray. If t(n) denotes the transmitted chip samples and r(n) denotes the received chip samples, where n is the discrete time index, then multipath time dispersion can be modeled as:

$$r(n) = \sum_{k=0}^{Nr-1} c(k)t(n-k) \quad (2)$$

where Nr is the number of rays caused by the multipath dispersion.

As a result of multipath time dispersion, the correlator outputs several smaller spikes rather than one large spike. To detect the transmitted symbols (and recover the data bits), the spikes received are combined in some way. Typically, this is done by a RAKE receiver, which is so named because it "rakes" all the multipath contributions together using a weighted sum.

A RAKE receiver uses a form of diversity combining to collect the signal energy from the various received signal paths, i.e., the various signal rays. Diversity provides redundant communication channels so that when some channels fade, communication is still possible over non-fading channels. A coherent CDMA RAKE receiver combats fading by detecting the echo signals individually using a correlation method and adding them algebraically (with the same sign).

In one form of the RAKE receiver, correlation values of the signature sequence with the received signals at different time delays are passed through a tapped delay line. The values stored in the delay line are weighted and then summed to form the combiner output. When the earliest arriving ray correlation is at one end of the tapped delay line and the latest arriving ray correlation is at the other end of the tapped delay line, the weighted sum is selected to give the combined signal value for a particular information symbol period. This is effectively sampling the output of a complex FIR filter, whose coefficients are the weights which are referred to as the RAKE tap coefficients. Usually only the real part of the filtered value is used. Also, in some implementations, only the selected filter output is actually computed.

Figure 1:
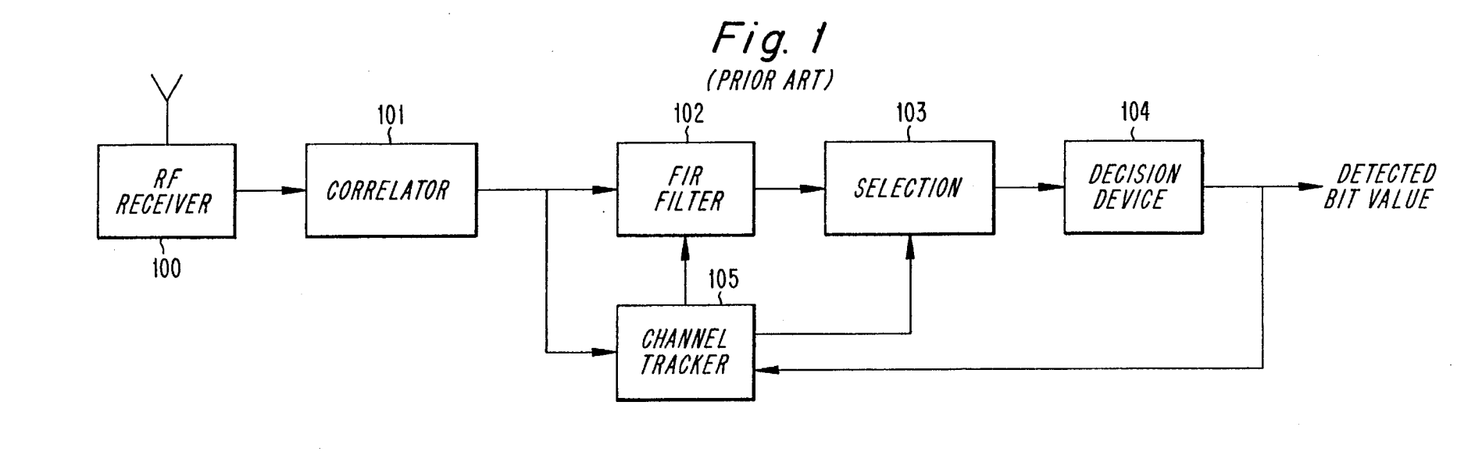
FIG. 1 illustrates a conventional RAKE receiver.

A diagram of a conventional RAKE receiver using post-correlator coherent combining of different rays is shown in FIG. 1. A received radio signal is mixed down to baseband and sampled, for example, by mixing it with cosine and sine waveforms and filtering the signal in an RF receiver 100, yielding I and Q chip samples. These chip samples are correlated to the known signature sequence in the correlator 101. Correlation values are then filtered by a finite-impulse-response (FIR) filter 102, which combines correlation values together using complex weights corresponding to the channel tap coefficients. Sometimes only the real part of the weighted values is needed. For example, if binary coherent modulation is used, then the sign of the real part of the selected value indicates whether a "+1" or "−1" was sent. At the appropriate time, based on symbol timing information, the FIR filter output is selected by selector 103, whose output is provided to a thresholding device 104, which uses the selected value to determine the information symbol. A channel tracking unit 105 is used to estimate the channel tap coefficients for the FIR filter 102.

Mathematically, suppose r(n)=I(n)+jQ(n) are the received chip samples, where I(n) are the I component samples, Q(n) are the Q component samples, and n is the sample index (discrete time index). The correlator correlates these data to the known signature sequence, s(n), to produce $$x(k) = \sum_{n=0}^{Nc-1} s^*(n)r(n+k) \quad (3)$$

where superscript * denotes complex conjugation, which is only needed if the signature sequence is complex.

The RAKE combiner is then a FIR filter that filters the correlations to produce a detection statistic z for transmitted symbol b.

$$z = \sum_{k=0}^{Nr-1} a^*(k)x(k) \quad (4)$$

where the filter coefficients a(k) are chosen as the channel tap coefficients:

$$a(k) = c(k) \quad (5)$$

In practice, these would be channel tap coefficient estimates. In the case of binary modulation, only the real part of z is used.

Typically, the RAKE receiver has a limited number of taps, allowing it to process a limited number of rays. The taps do not need to be placed next to each other (e.g., if $c(0)$, $c(2)$, and $c(5)$ are nonzero, these rays can be processed by a 3-tap RAKE receiver). However, in explaining the RAKE operation, it is convenient to assume that the tap locations are contiguous. The noncontiguous tap case is a special case of the contiguous tap case, where certain intervening taps have RAKE tap coefficients of zero. For example, a 3-tap RAKE which collects rays $k=0$, 2, and 5 is a special case of a 6-tap RAKE with collects rays at $k=0$ through 5, but with zero RAKE tap coefficients for rays $k=1$, $k=3$ and $k=4$.

The RAKE tap coefficient values given by equation (5) are based on the assumption that the spread-spectrum signal is received in the presence of white noise. White noise gives noise samples (chip samples) that are uncorrelated with each other.

In many systems, such as cellular systems, the receiver experiences interference from multiple transmitters, including the transmitter that transmits the desired signal. Also, noise from the environment affects receiver performance. Thus, in general, there are two sources of noise at the receiver: a) pre-channel noise, such as interfering signals from the same transmitter as the signal, and b) post-channel noise, including both thermal noise and interference from other transmitters. Pre-channel noise at the transmitter and post-channel noise at the receiver can often be modeled as white noise processes.

First consider the pre-channel noise. In most wireless CDMA applications, such as cellular communications, a star network is used in which mobiles communicate with a central structure referred to as a base station. In the downlink, also referred to as the forward path, the base station communicates with the mobiles by transmitting all signals simultaneously. Thus, at a particular mobile receiver, both the desired signal and interfering signals from that base station pass through the same channel. Assuming the interference can be modeled as white noise at the transmitter, then this interference is colored by the channel, giving rise to colored noise at the receiver. Consequently, part of the receiver noise is colored. In cellular systems, this part represents a large portion of the total noise.

The conventional RAKE filter was designed assuming white noise and does not work well when the noise is colored. Accordingly, the conventional RAKE filter is not an optimal solution for a mobile receiver. Thus, there is a need for a better downlink receiver for mobile units in radiocommunication systems.

SUMMARY

These and other drawbacks and difficulties of conventional systems are overcome according to the present invention. Exemplary embodiments of the present invention detect CDMA signals in the presence of colored noise. This is accomplished by replacing the RAKE FIR combining filter with a more general filter, for example, an IIR or FIR filter. Next, the general filter is provided with tap locations and tap coefficients that are optimal for the CDMA downlink case. These filter parameters can be determined as a function of certain communication link parameters. Alternatively, the filter parameters can be determined directly using an adaptive filtering approach, eliminating the need to directly estimate the link parameters. Improving receiver performance in this way allows the CDMA system to provide better quality and/or to increase capacity.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

According to exemplary embodiments of the present invention, the filter operation which follows the correlation process in a downlink, direct-sequence CDMA receiver is optimized so that the probability that the detected information symbols are the same as the transmitted information symbols is maximized. In other words, the probability of incorrectly detecting the transmitted information is minimized. Optimization is based on maximizing the signal-to-noise ratio (SNR) of the detection statistic, taking into account that the pre-channel noise is colored by the same channel as the signal channel.

According to an exemplary embodiment of the present invention the RAKE FIR combining filter is replaced with an infinite-impulse-response (IIR) filter, with transfer function $H(z)$. Maximizing SNR, $H(z)$ of the IIR filter is given by $$H(z) = K \frac{C^*(z^{-1})}{C^*(z^{-1})C(z)X + N} \tag{6}$$

where $$C(z) = c(0) + c(1)\ z^{-1} + c(2)\ z^{-2} + \tag{7a}$$

$$C^*(z^{-1}) = c^*(0) + c^*(1)\ z^1 + c^*(2)\ z^2 + \tag{7b}$$

X is the pre-channel noise power, N is the post-channel noise power, and K is an arbitrary scaling factor. Thus $C(z)$ is the z-transform of the channel coefficients $c(k)$.

The IIR filter has a forward filter part, $A(z)$, and a backward filter part $B(z)$, such that $H(z)=A(z)/B(z)$. From equation (6), it is seen that these parts are given by:

$$A(z) = C^*(z^-) \tag{8a}$$

$$B(z) = C^*(z^{-1}) \, C(z) \, X + N \qquad (8b)$$

In practice, c(k) would be estimated, as well as X and N. Also, X and N can be replaced by related values, such as X/(N+X) and N/(N+X). The IIR filter coefficients a(k) and b(k) are related to their z-transforms by:

$$A(z) = \sum_k a(k) z^{-k}, B(z) = \sum_k b(k) z^{-k} \qquad (8c)$$

where it is assumed that the IIR filter output y(n) is related to the IIR filter input x(n) by:

$$\sum_k b(k) y(n-k) = \sum_k a(k) x(n-k) \qquad (8d)$$

The IIR filter can be implemented in a number of ways, as discussed in, for example, A. V. Oppenheim and R. W. Schafer, *Digital Signal Processing*. Englewood Cliffs, N.J.: Prentice-Hall, 1975.

Note that if there is no pre-channel noise (i.e., X=0), then the filter acts like the RAKE combiner, since B(z) is a constant and A(z) is $c^*(0) + c^*(1) z + \ldots$ etc. At the other extreme, when N is zero, terms cancel so that A(z) is a constant and B(z)=C(z). This effectively undoes the channel, which can be viewed as a simple linear equalizer. Thus, applying the present invention gives a filtering operation that provides a continuum between these two extremes.

The approach can be extended to model the effects of the channels from different base stations. In essence, the term $C^*(z^{-1}) C(z) X$ is replaced by a sum of such terms, one for each interfering base station being modeled. The approach can also be extended to the case where multiple base stations transmit the same information sequence, which is done to provide macro-diversity or to provide soft-handover. In general, there is a C(z) and X for each base station, denoted $C_b(z)$ and $X_b$. The expression in equation (6) then becomes $$H(z) = K \frac{C_{eff}^*(z^{-1})}{N + \sum_b C_b^*(z^{-1}) C_b(z) X_b}$$

where $C_{eff}(z)$ is the effective channel that the signal sees, given by the sum of the $C_b(z)$ values that correspond to the base stations transmitting the desired signal. In the denominator, the summation may include base stations which are not transmitting the desired signal, but which contribute a significant amount of interference.

Figure 2:
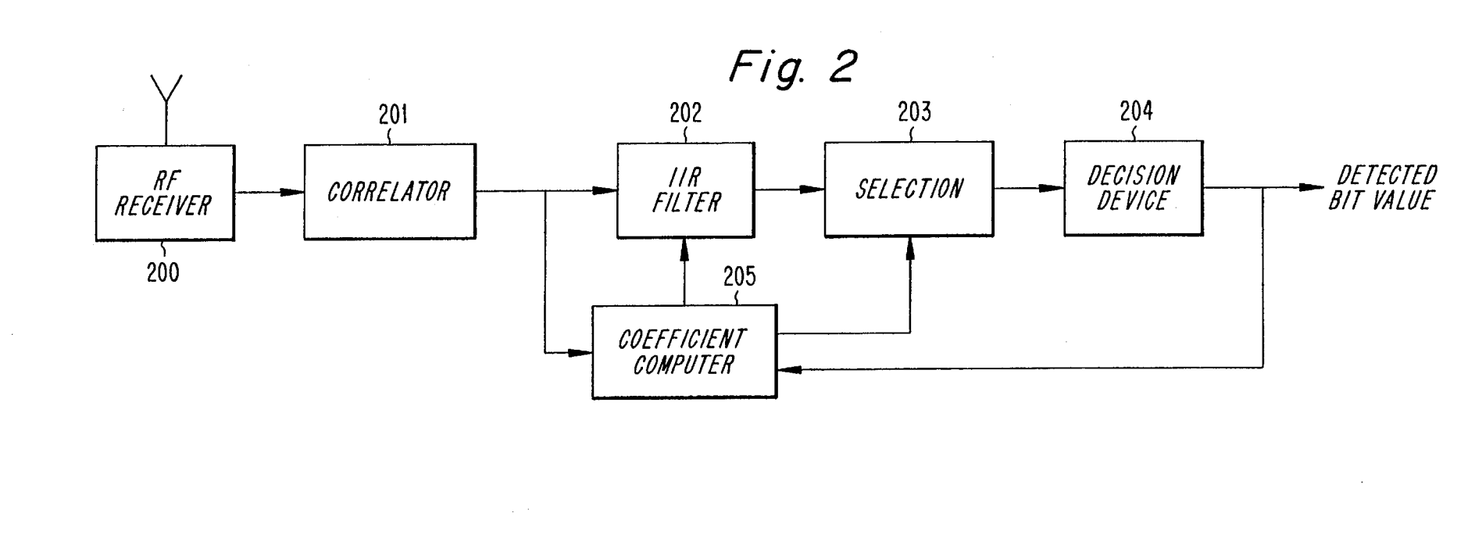
FIG. 2 is a block diagram of a receiver including an IIR filter according to an exemplary embodiment of the present invention.

A block diagram of a receiver according to this exemplary embodiment is shown in FIG. 2. A received radio signal is mixed down to baseband and sampled, for example, by mixing it with cosine and sine waveforms and filtering the signal in an RF receiver 200, yielding complex chip samples. Those skilled in the art will readily appreciate that, for all of the exemplary embodiments disclosed herein, the incoming radio signal could be digitized in a conventional cartesian manner or, alternatively, could be processed in log-polar fashion according to U.S. Pat. No. 5,048,059 to Paul W. Dent entitled "Log-Polar Signed Processing" which disclosure is incorporated here by reference. The complex chip samples may be processed in log-polar form or converted to conventional I and Q values.

These chip samples are correlated to the known signature sequence in the correlator 201. Correlation values are then filtered by an IIR filter 202. At the appropriate time, based on symbol timing information, the IIR filter output is selected by selector 203, which provides the selected output to a decision device 204, which uses the IIR filter output to determine which information symbol is detected. A coefficient computer unit 205 is used to determine the tap coefficients for use in the IIR filter 202. This includes estimation of the channel taps and noise powers, or related quantities.

Those skilled in the art will readily appreciate that, for all of the exemplary embodiments disclosed herein, the correlator may take on a variety of forms. For example, with feedback from the coefficient computer, not shown in the Figures, the correlator may be restricted to compute only those correlations needed by the subsequent filtering operation as well as correlations needed to adaptively determine channel tap positions and strengths, sometimes referred to as search taps. Another possibility is that the correlator consists of a bank of M multipliers which multiply the received signal with various delayed versions of the signature sequence. Each multiplier is followed by some form of integrator, which effectively accumulates the product of the received chip samples with the signature sequence chip samples. The integrator outputs are periodically reset to zero. This gives M correlation values per symbol period. All forms can be made to operate in the case where the signature sequence is much longer than the information symbol period, in which case the effective Nc chip signature sequence is a subsequence of the longer sequence. Finally, to reduce intersymbol interference (ISI), it may be advantageous to correlate the data to only part of the signature sequence. For example, if there are only two adjacent channel taps and the signature sequence is $S(0) \ldots S(Nc-1)$, then ISI is avoided by correlating to $S(1) \ldots S(Nc-2)$.

Also, those skilled in the art will readily appreciate that, for all of the exemplary embodiments disclosed herein, the form of the decision device will depend on the modulation used. For traditional CDMA and M'ary coherent modulation, the decision device determines which possible information symbol the detection statistic is closest to, assuming equi-likely information symbols. For example, for binary coherent modulation, the sign of the real part of the detection statistic indicates whether a+1 or a−1 has been sent. For M'ary differentially coherent modulation, two detection methods are possible. In the first, referred to as coherent demodulation, each detection statistic is demodulated as if it were M'ary coherent modulation. Then, the demodulated result is compared to the previously demodulated result to determine the information symbol. In the second method, referred to as differential detection, the detection statistic is multiplied by the conjugate of the previous detection statistic and the result is used to determine which differential symbol it is closest to.

For noncoherent modulation, including enhanced CDMA, there would be correlator, filter, and selection devices for each possible transmitted sequence. Thus, the decision device would be presented with M detection statistics, one for each possible transmitted sequence. The statistic which is largest, in some sense, would indicate which sequence is detected and hence the information bits. For example, the detection statistic which has the most positive real part would indicated which sequence is detected. For the special case of enhanced CDMA using a common scramble mask and Walsh-Hadamard code words, the correlator device can be further simplified. First, the sampled data would be descrambled with the common scrambling mask. Then, a fast Walsh transform would be performed, giving all M correlations in parallel in an efficient way. This process would be performed for each shift of the data to be used by the subsequent filtering. Each of the M correlation streams would be separately filtered and selected.

All exemplary embodiments of the present invention can take on these various forms, depending on the modulation used. For illustrative purposes only, discussion of the remaining embodiments will focus on the M'ary coherent modulation case.

An adaptive form of the receiver of FIG. 2 can also be used. Rather than determining the filter coefficients from equations (8a) and (8b), an adaptive algorithm can be used to estimate and track a(k) and b(k). Any of a number of adaptive algorithms for adaptive IIR filters can be used, see, for example, S. Haykin, Adaptive Filter Theory, 2nd ed. Englewood Cliffs, N.J.: Prentice-Hall, 1991.

Figure 3:
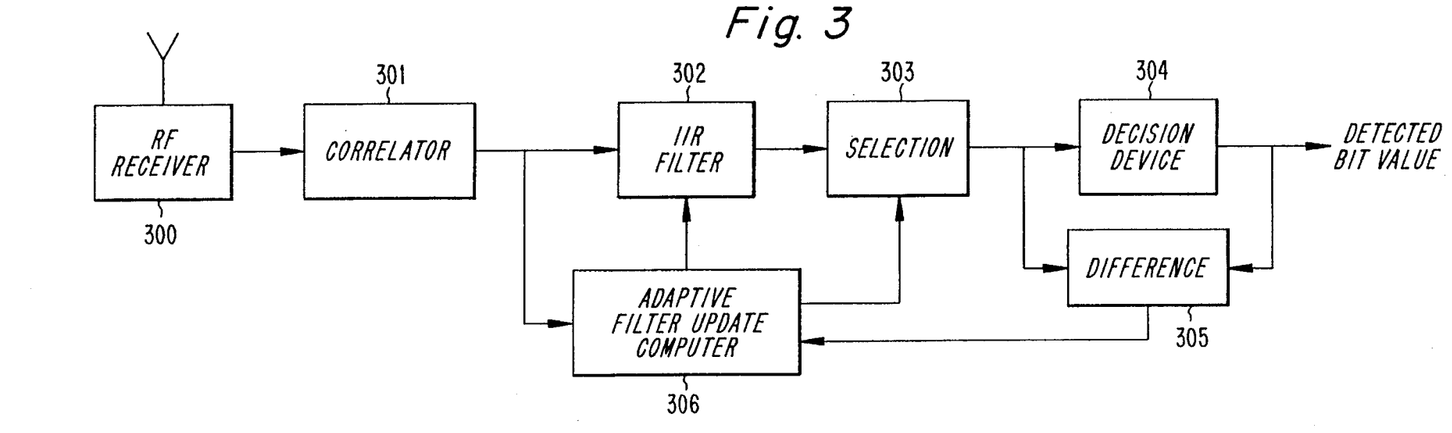
FIG. 3 is a block diagram of a receiver including adaptive IIR filter according to another exemplary embodiment of the present invention.

A block diagram of an exemplary receiver incorporating an adaptive IIR filter is shown in FIG. 3. A received radio signal is mixed down to baseband and sampled, for example, by mixing it with cosine and sine waveforms and filtering the signal in an RF receiver 300, yielding complex chip samples. These chip samples are correlated to the known signature sequence in the correlator 301. Correlation values are then filtered by an adaptive IIR filter 302. At the appropriate time, based on symbol timing information, selector 303 selects the filter output (a detection statistic) for detection by decision device 304, which uses the selected value to determine which information symbol is detected. Difference unit 305 takes the difference between the outputs of the decision 304 and selection 303 devices, forming an error signal. The error signal from the difference unit 305, as well as correlations from block 301, are sent to an adaptive filter update computer 306, which adaptively updates the IIR filter coefficients.

$$z = \sum_{k=kmin}^{kmax} a^*(k)x(k)$$

The RAKE filter tap locations can be seen as a special case where $kmin=-(Nr-1)$ and $kmax=0$. In practice, the tap locations do not have to be contiguous.

A second difference between the modified RAKE filter and the conventional RAKE filter is the values used for the RAKE tap coefficients. The conventional RAKE filter uses estimates of the channel taps as the RAKE tap coefficients, as given in equation (5). These coefficients are not optimal when there is pre-channel noise, as is the case in the CDMA downlink.

The optimal tap locations and coefficients for a CDMA downlink are derived in: G. E. Bottomley, "Optimizing the RAKE receiver from the CDMA downlink, 43rd *IEEE Vehicular Technology Conference*, Secaucus, N.J., pp. 742–745, May 18–20, 1993 which is incorporated here by reference. For a particular kmax value (i.e., tap location), they are given by:

$$a_{mod\ RAKE} = [X\ CSS^H C^H + N\ S'S'^H]^{-1}\ CSs \qquad (10)$$

where $$C = \begin{bmatrix} c(Nr-1) & c(Nr-2) & \ldots & c(0) & 0 & \ldots & & \ldots & 0 \\ 0 & c(Nr-1) & \ldots & c(1) & c(0) & 0 & & \ldots & 0 \\ \ldots & \ldots & \ldots & \ldots & \ldots & \ldots & & \ldots & \ldots \\ 0 & \ldots & & \ldots & \ldots & 0 & c(Nr-1) & \ldots & c(0) \end{bmatrix} \qquad (11a)$$

$$S = \begin{bmatrix} s^*(0) & s^*(1) & \ldots & s^*(Nc-1) & 0 & & \ldots & \ldots & 0 \\ 0 & s^*(0) & \ldots & s^*(Nc-2) & s^*(Nc-1) & 0 & & \ldots & 0 \\ \ldots & \ldots & \ldots & \ldots & \ldots & & \ldots & \ldots & \ldots \\ 0 & \ldots & \ldots & \ldots & 0 & & s^*(0) & \ldots & s^*(Nc-1) \end{bmatrix} \qquad (11b)$$

$$S' = \begin{bmatrix} s^*(0) & s^*(1) & \ldots & s^*(Nc-1) & 0 & & \ldots & \ldots & 0 \\ 0 & s^*(0) & \ldots & s^*(Nc-2) & s^*(Nc-1) & 0 & & \ldots & 0 \\ \ldots & \ldots & \ldots & \ldots & \ldots & & \ldots & \ldots & \ldots \\ 0 & \ldots & \ldots & \ldots & 0 & & s^*(0) & \ldots & s^*(Nc-1) \end{bmatrix} \qquad (11c)$$

$$s = [s\ (-kmax-(Nr-1)) \ldots s(Nr-1) \ldots s(-kmin) \ldots s(-kmin+Nc-1)]^T \qquad (11d)$$

$$a_{mod\ RAKE} = [a(kmax) \ldots a(kmin)]^T \qquad (11e)$$

According to another exemplary embodiment of the present invention, an FIR post-correlator filter, which approximates in a least-squares sense the optimal IIR filter for a CDMA downlink receiver, is provided. This form is referred to herein as the modified RAKE filter, but there are at least two differences between the inventive modified RAKE and conventional RAKE filters: 1) modified RAKE filter taps are not necessarily placed where RAKE filter taps would be placed (i.e., the positions where signal rays appear) and 2) the modified RAKE filter tap coefficients, used to weight the correlation values, are computed in a much different manner than the RAKE filter coefficients. These features will now be described in detail.

As indicated above, the first difference between the modified RAKE filter and the conventional RAKE filter is that taps are not necessarily placed in the same positions. As discussed previously, it is convenient to assume that the channel consists of a set of contiguous rays arriving at discrete times 0 through Nr-1. In general, the modified RAKE filter places taps at times k=kmin through k=kmax. Thus, the modified RAKE filter processes the correlation values as follows:

and X is the power in the pre-channel noise (interference from own base), N is the power in the post-channel noise (interference from other bases and thermal noise), C is a matrix with Nt rows and Nt+Nr-1 columns, S is a matrix with Nt+Nr-1 rows and Nt+Nr+Nc-2 columns, S' is a matrix with Nt rows and Nt+Nc-1 columns, and Nt is the number of modified RAKE taps (Nt=kmax-kmin+1). Note that, depending on the choices of kmin and kmax, some values in the s vector may be zero, since the only nonzero values are s(0) through s(Nc-1).

For a particular set of tap locations, the signal-to-noise ratio, a figure of merit to be maximized, is given by:

$$SNR(kmax) = s^H S^H C^H\ [X\ CSS^H C^H + N\ S'S'^H]^{-1}\ CSs \qquad (12)$$

Thus, one can consider different kmax values in the range $[-(Nr-1), (Nr-1)]$ and find the one that maximizes SNR. For that kmax value, the tap coefficients are then determined from equation (10).

The matrix C contains the channel tap values. In practice, these would be estimates of the channel tap values. The X and N values would be estimates of the pre-channel and post-channel noise powers, respectively. Also, the matrices S and S' contain elements of the signature sequence s(0), s(1), . . . s(Nc−1). Usually, this sequence consists of real numbers (+1 values), so that conjugation has no effect.

Again, this approach can be extended to model the effects of the channels from different base stations. In essence, the term $X \, CSS^H C^H$ is replaced by a sum of such terms, one for each interfering base station being modeled. Also, the approach can be extended to the case where multiple base stations transmit the same information sequence, which is done to provide macro-diversity or to provide soft-handover. In these cases, there is a C matrix and X for each base station, denoted $C_b$ and $X_b$. The expression in (10) becomes:

$$a_{mod \, RAKE} = \left[ N S'S^H + \sum_b X_b C_b SS^H C_b^H \right]^{-1} C_{eff} S_S$$

where $C_{eff}$ is the sum of the $C_b$ values that correspond to the base stations transmitting the desired signal. In the matrix inverse term, the summation may include base stations which are not transmitting the desired signal, but which contribute a significant amount of interference.

An alternative computation of the a vector can be employed. Pseudo-noise (PN) sequences are commonly used as signature sequences. They have the statistical property that the correlation of the sequence with a time shifted version of the sequence is small, relative to the correlation with no shift. Correlation with no shift of a ±1 sequence gives the value Nc, where Nc is the length of the sequence. As a result, the following approximations are valid:

$$SS^H = Nc \, I \qquad (13a)$$

$$S'S'^H = Nc \, I \qquad (13b)$$

$$CSs = Nc \, S \, b \qquad (13c)$$

where $$b = [c(-kmax) \ldots c(-kmin)]^T, \qquad (13d)$$

S is the signal power,
and c(k) is defined to be 0 when k<0 or k>Nr−1. Substitution of equations (13a)–(13d) into equations (10) and (12) give the simplified expressions as follow.

$$a(kmax) = \left[ \frac{X}{S} CC^H + \frac{N}{S} I \right]^{-1} b \qquad (13e)$$

$$SNR(kmax) = Nc \, b^H \left[ \frac{X}{S} CC^H + \frac{N}{S} I \right]^{-1} b \qquad (13f)$$

In practice, the terms X/S and N/S can be replaced by a set of related terms. One set would be X/(N+X), i.e., the fraction of the total noise due to pre-channel noise, and N/(N+X), the fraction of the total noise due to post-channel noise. As can be seen from the foregoing discussion, the modified RAKE filter tap coefficients will differ from the RAKE filter tap coefficients. Even if the taps are placed in the same places as the RAKE filter taps, the coefficients will be different, since X/S is typically nonzero.

Figure 4:
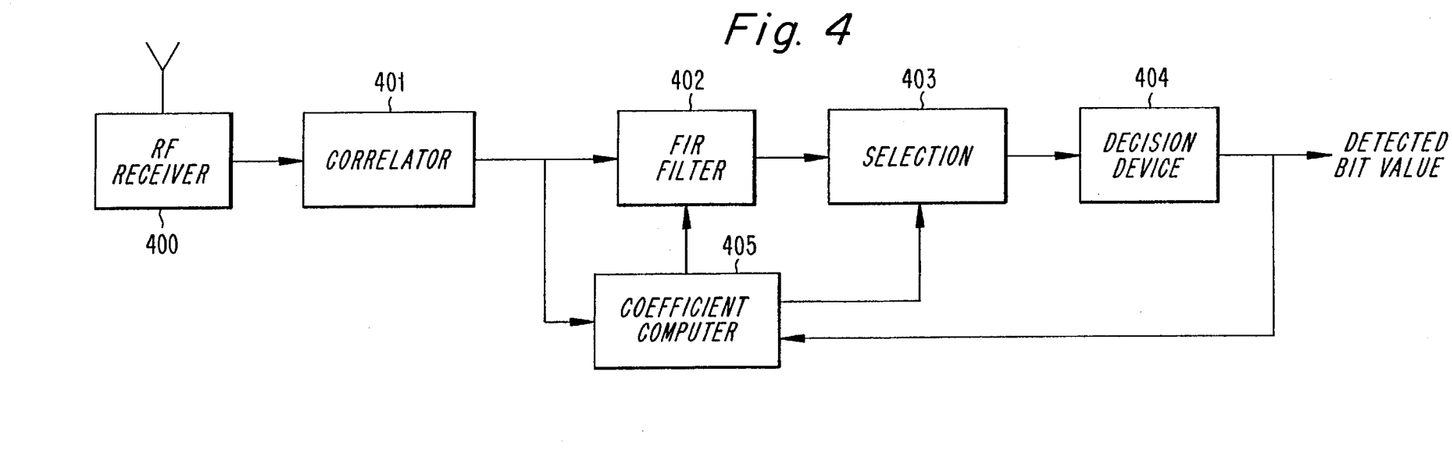
FIG. 4 is a block diagram of a receiver including a FIR filter according to another exemplary embodiment of the present invention.

A block diagram of an exemplary receiver according to the above-described principles is shown in FIG. 4. A received radio signal is mixed down to baseband and sampled, for example, by mixing it with cosine and sine waveforms and filtering the signal in an RF receiver 400, yielding complex chip samples. These chip samples are correlated to the known signature sequence in the correlator 401. Correlation values are then filtered by an FIR filter 402. At the appropriate time, based on symbol timing information, a selector 403 provides the filtered output to a decision device 404, which uses the FIR filter output to determine which information symbol is detected. A coefficient computer unit 405 is needed to determine the tap coefficients as described above for use in the FIR filter 402. This includes estimation of the channel taps and noise powers, or related quantities.

Next, the performance of the conventional RAKE receiver and the modified RAKE receiver for both a two ray static channel and a multiple ray fading channel will be compared.

First, the output SNRs of the conventional RAKE and modified RAKE filters are compared for the two ray static channel. These SNRs are normalized using the matched filter SNR, giving a loss relative to the matched filter. It is assumed that at least Nr filter taps are available for both the conventional RAKE and modified RAKE filters (i.e., Nt≧Nr). Unity channel gain is assumed.

When only one of the channel taps is nonzero, the matched filter, conventional RAKE filter, and modified RAKE filters have the same performance. Also, when other cell interference dominates (i.e., X=0), all three filters are equivalent. However, when X is nonzero, both the modified RAKE and conventional RAKE filters incur losses. The case where same cell interference dominates (X>> N, or N=0) is considered below.

Figure 5:
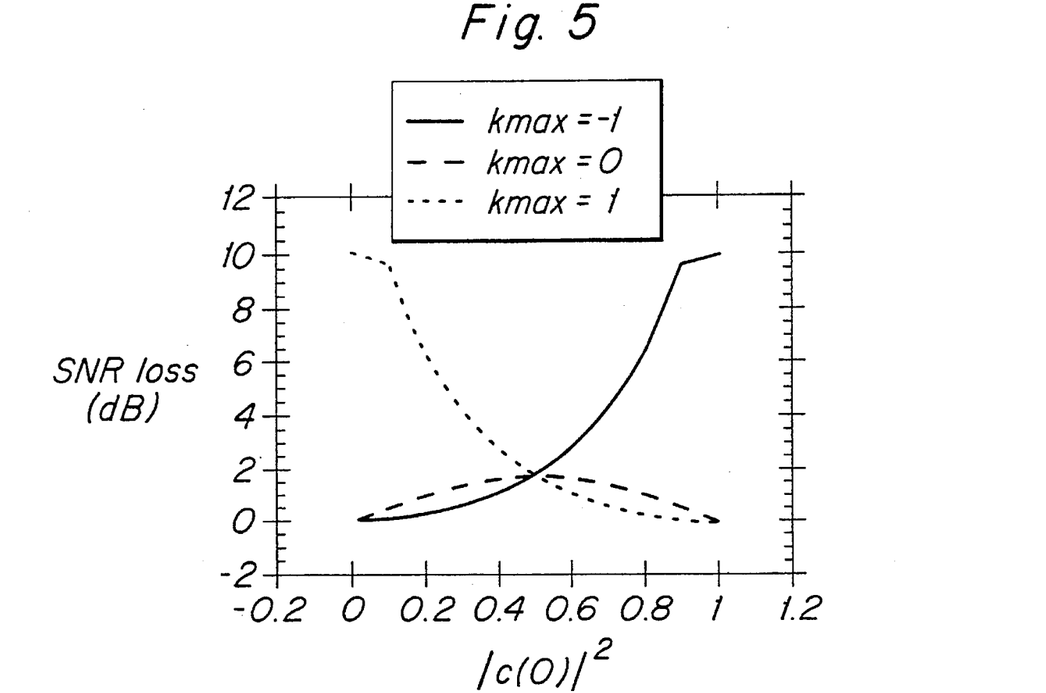
FIG. 5 is a graph illustrating filter signal-to-noise losses for different tap locations for a two ray channel.

For a two ray channel with unity channel gain, loss for the conventional RAKE and modified RAKE filters can be expressed as a function of $|c(0)|^2$. For this case, the loss of the 2-tap modified RAKE filter with fixed kmax is shown in FIG. 5. The overall loss of the 2-tap modified RAKE filter is given by the minimum of the three curves. Notice that this leads to the kmax=−1 curve (taps at −1 and −2) when $|c(0)|^2$ is less than 0.5 and the kmax=1 curve (taps at 1 and 0) when $|c(0)|^2$ is greater than 0.5.

By contrast, the conventional RAKE filter uses kmax equal to 0, corresponding to a RAKE tap at 0, which collects energy from the c(0) ray, and a tap at −1 which collects energy from the c(1) ray. This feature of the conventional RAKE filter is illustrated graphically in FIG. 6(a) for the case where |c(0)|>|c(1)|. Therein, the bar graph indicates the output of the correlator as a function of time, indicating the largest ray (with amplitude |c(0)|) at time 0 and the second largest ray (with amplitude |c(1)|) at time 1. Directly beneath this bar graph is a block diagram which indicates how the conventional RAKE receiver would filter these correlations, i.e., by multiplying the correlation at time 0 by c*(0) and adding to it the product of the correlation at time 1 with c*(1).

Figure 6A:
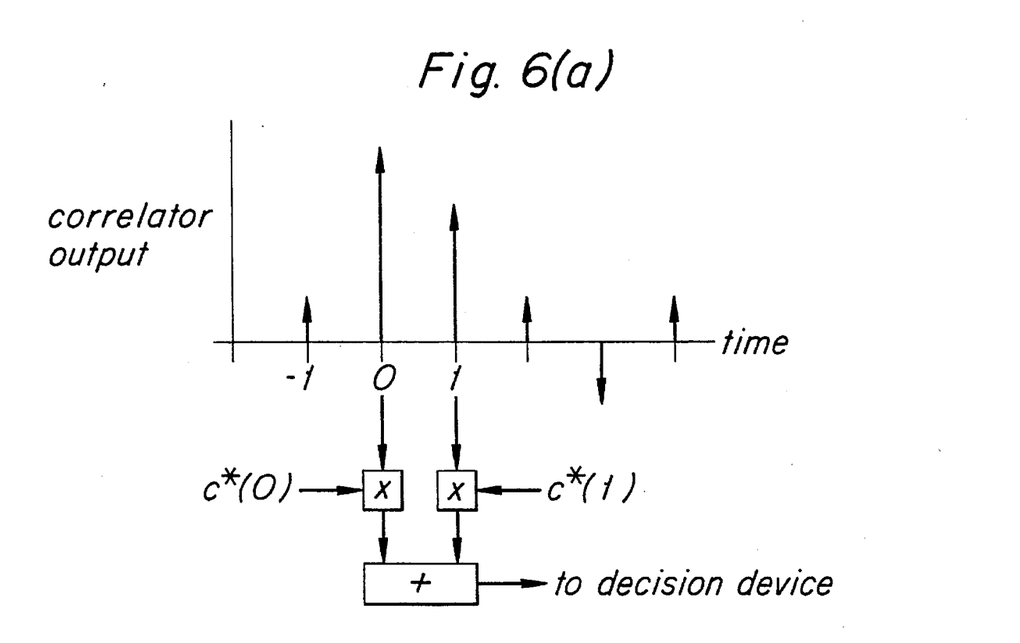
FIG. 6(a) is an illustration of correlator outputs being applied to taps of a conventional RAKE receiver.
Figure 6B:
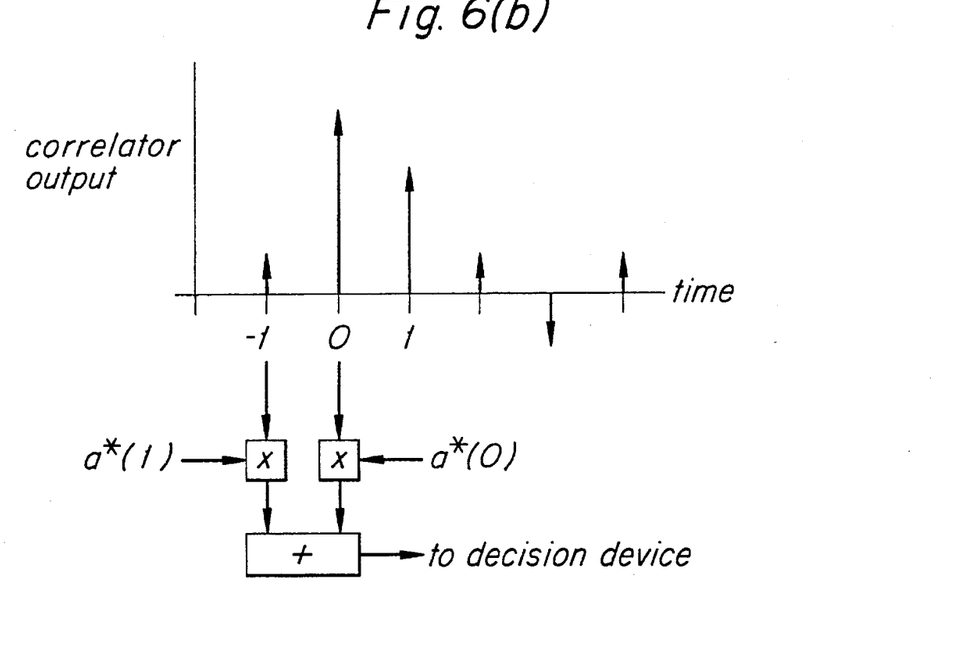
FIG. 6(b) is an illustration of correlator outputs being applied to taps of a modified RAKE receiver.

In the modified RAKE filter, however, one tap is placed where the strongest ray appears, but the second tap is placed on the opposite side of where the second strongest ray appears. A graphical example of this operation is shown in FIG. 6(b) for the same case illustrated in FIG. 6(a). Note the same bar graph having the same correlation outputs as that of FIG. 6(a) is also shown in this Figure. Again, a block diagram below the bar graph indicates how the modified RAKE receiver would filter these correlations. Note, however, that the modified RAKE filter multiplies the correlation at time 0 by a*(0), not necessarily equal to c*(0), and adds to this product, the product of the correlation at time −1 with a*(1).

The rationale behind the tap placement in the modified RAKE receiver in this exemplary embodiment of the present invention is best understood by examining the inverse channel response. For a two tap channel, the channel response is given by:

$$H(z) = h(0) + h(1)z^{-1} = c(0) + c(1)z^{-1} \quad (14)$$

Computing the impulse response of $1/H(z) = G(z)$, using stability as a criterion for selecting the region of convergence (ROC) for the inverse transform, gives:

$$g(k) = \begin{cases} \begin{cases} \frac{1}{c(0)} \left( \frac{-c(1)}{c(0)} \right)^k & k \geq 0 \\ & \left| \frac{c(1)}{c(0)} \right| < 1 \\ 0 & k < 0 \end{cases} \\ \begin{cases} -\frac{1}{c(0)} \left( \frac{-c(1)}{c(0)} \right)^k & k < 0 \\ & \left| \frac{c(1)}{c(0)} \right| > 1 \\ 0 & k \geq 0 \end{cases} \end{cases} \quad (15)$$

Note that this assumes $g(k)$, not $g^*(k)$, filter the data. When $c(0)$ is the largest ray, taps for the inverse channel filter are located at $0, 1, 2 \ldots$; when $c(1)$ is the largest ray, taps for the inverse channel filter are located at $-1, -2, \ldots$ Since the combining part of the modified RAKE filter is a least-squares approximation to the channel inverse filter, it should not be surprising that the modified RAKE combining filter with two filter taps uses tap placements of 0 and 1 when $c(0)$ is the largest ray, and $-1$ and $-2$ when $c(1)$ is the largest ray. This is consistent with trying to match the stable response $g(k)$, i.e., trying to undo the channel.

In this example, the modified RAKE uses one tap to collect the signal energy from the strongest ray. The modified RAKE uses the second tap to cancel interference. This feature can be seen by considering the RAKE combining filter as preceding the correlating filter. For example, suppose $x(n)$ is transmitted and $y(n) = c(0)x(n) + c(1)x(n-1)$ is received, where $|c(0)| > |c(1)|$. The standard multitap RAKE combining filter forms:
$z(n) = c^*(0)y(n) + c^*(1)y(n+1) = Gx(n) + c^*(0)c(1)x(n-1) + c(0)c^*(1)x(n+1)$,
where $G = |c(0)|^2 + |c(1)|^2$ is the channel gain. Assuming random signature sequences, this results in signal power $GS$ and interference power $(G + 2|c(0)|^2|c(1)|^2)X$, prior to correlation and making a decision. A larger gain is given to the interference, $X$, because the RAKE coherently combines the interference as well as introduces additional interchip interference terms.

By contrast, the multitap modified RAKE forms:
$z(n) = (1/c(0))y(n) - (c(1)/c^2(0))y(n-1) + \ldots = x(n) + (c(1)/c(0))x(n-1)(c(1)/c(0))x(n-1) - (c(1)/c^2(0))x(n-2) + \ldots = x(n)$.
Observe that the interchip contributions are cancelled. Again, assuming random signature sequences, this gives a signal power of $S$ and interference power $X$, prior to the correlator, giving a better SNR than with the conventional RAKE.

Figure 7:
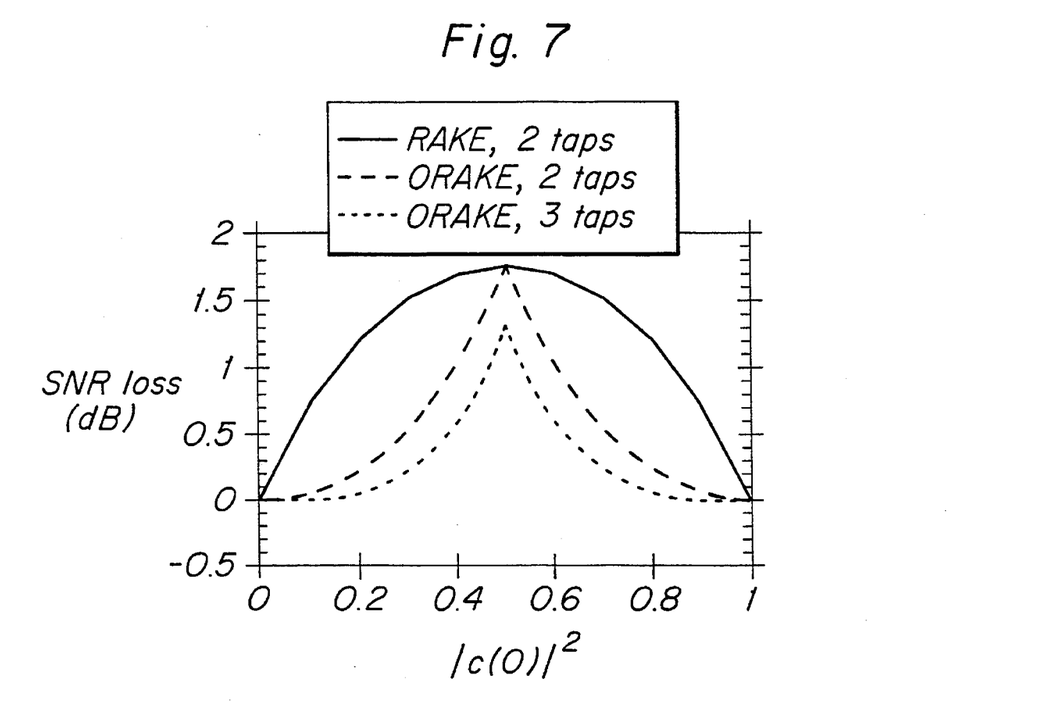
FIG. 7 is a graph of RAKE and modified RAKE filter losses for a two tap channel with only same cell interference.

As pointed out earlier, the modified RAKE filter can provide improved performance by using more than $N_r$ taps, whereas the RAKE filter cannot. The overall modified RAKE filter loss for 2 and 3 taps and the RAKE loss for plural (i.e., 2 or any greater number) taps are plotted in FIG. 7. When $c(0)$ or $c(1)$ is zero, there is only one channel tap, and both filters are equivalent to the matched filter. When $|c(0)| = |c(1)|$, the loss is maximized for both filters, giving the same loss when both filters use two taps. Otherwise, the modified RAKE filter provides less loss than the RAKE filter. Additional taps do not benefit the RAKE filter, but clearly provide improved SNR for the modified RAKE filter by providing additional interference cancellation.

Next, performance of the modified RAKE filter and RAKE filter are compared for a multiple ray fading channel, with an average channel gain of unity and an average ray gain, $E\{|c(i)|^2\}$ of $1/N_r$ (i.e., equal average energy rays). This comparison is done by Monte-Carlo simulation of the channel ray values $c(i)$, such that $\text{Re}\{c(i)\}$ and $\text{Im}\{c(i)\}$ are zero mean independent Gaussian random variables with variance $1/(2 N_r)$. This gives $|c(i)|$ a Rayleigh distribution with a mean square value of $1/N_r$. The fading level was assumed constant for the duration of the transmitted symbol. The loss in SNR for the modified RAKE and RAKE filters was determined by normalizing the SNRs with respect to the SNR of a matched filter. The number of taps $N_t$ used by the filters was set equal to $N_r$, the number of signal rays. Performance for binary coherent modulation is expressed in terms of bit-error-rate (BER) as a function of $E_b/N_o$ or $E_b/X_o$, where $E_b$ is the energy-per-bit, and $N_o$ and $X_o$ are the post-channel and pre-channel noise spectral densities in the band of interest.

Figure 8:
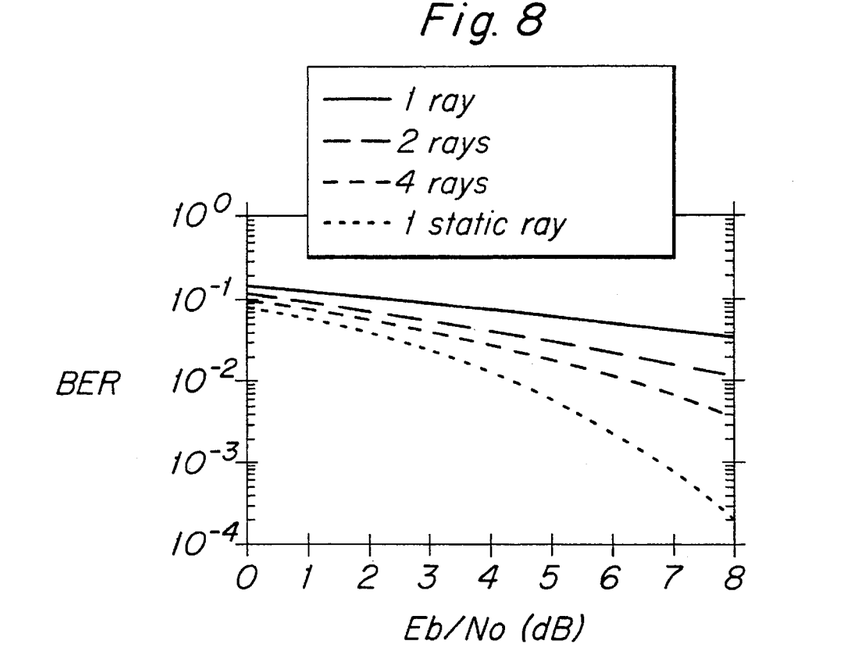
FIG. 8 is a graph of receive filter performance in a fading channel with no same cell interference.
Figure 9:
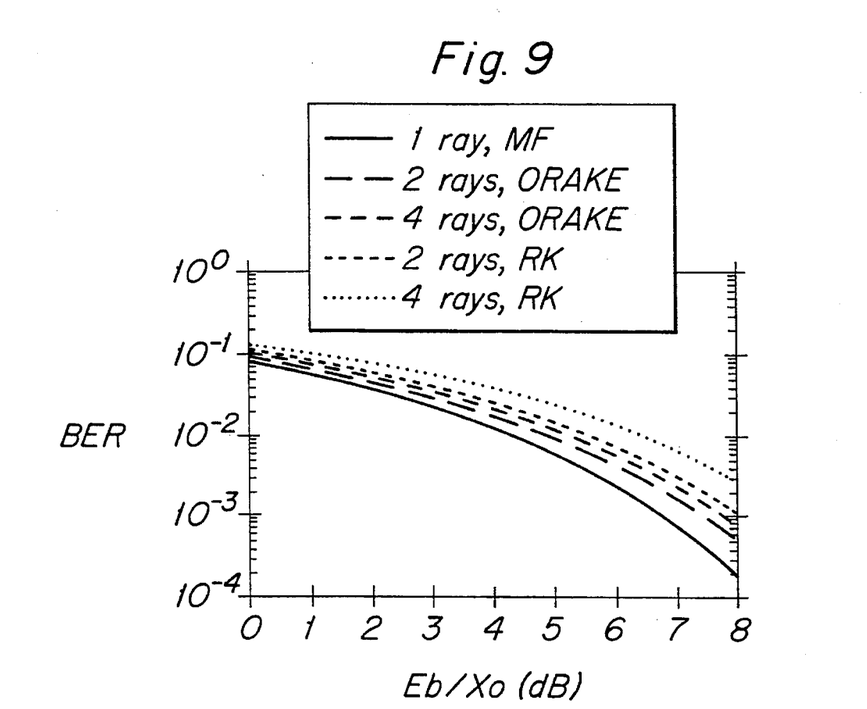
FIG. 9 is a graph of receive filter performance in a fading channel with only same cell interference.

First, for the case when there is only post-channel noise ($X/S=0$, $X_o=0$), all three filters are equivalent. BER curves for different number of rays are given in FIG. 8. Second, FIG. 9 shows results for the case when there is only pre-channel noise ($N/S=0$, $N_o=0$). In this case, signal and noise fade together, so that the performance of the matched filter is independent of the number of rays, being equivalent to the static channel case with a channel gain of unity.

For a single ray channel, the RAKE and modified RAKE filters are equivalent to the matched filter. For more than one ray, there is a loss in performance that increases with the number of rays. Thus, for a given BER, the RAKE and modified RAKE filters require an excess $E_b/X_o$ (which can be expressed as an excess SNR) to achieve the same performance. This can be used to define a loss in performance.

For 1% BER and two rays, the $E_b/X_o$ losses for the modified RAKE and RAKE filters are 0.6 dB and 1.3 dB respectively. For four rays, the losses are 0.9 dB and 2.1 dB respectively. Thus, when N is small relative to X, the modified RAKE filter performance is significantly better than the RAKE filter performance. The modified RAKE filter performance can be further improved, reducing the loss arbitrarily close to 0 dB, by adding taps, which is not true of the RAKE filter.

As in the IIR filter exemplary embodiments, the FIR filter embodiment can be realized in an adaptive form. Any of a number of adaptive algorithms for adaptive FIR filters can be used, see, for example, S. Haykin, *Adaptive Filter Theory, 2nd ed.* Englewood Cliffs, N.J.: Prentice-Hall, 1991.

Figure 10:
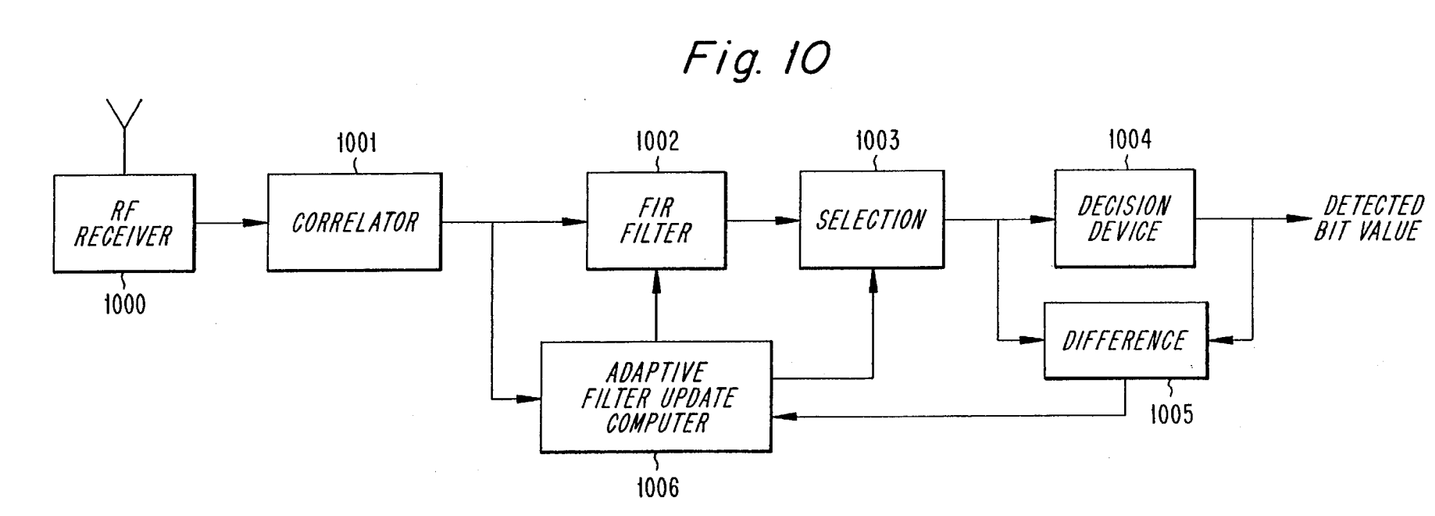
FIG. 10 is a block diagram of a receiver including an adaptive FIR filter according to still another exemplary embodiment of the present invention.

A block diagram of an exemplary receiver using an adaptive FIR filter is shown in FIG. 10. A received radio signal is mixed down to baseband and sampled, for example, by mixing it with cosine and sine waveforms and filtering the signal in an RF receiver 1000, yielding complex chip samples. These chip samples are correlated to the known signature sequence in the correlator 1001. Correlation values are then filtered by an adaptive FIR filter 1002. At the appropriate time, based on symbol timing information, a selector 1003 provides the filtered output to a decision device 1004, which uses the FIR filter output to determine which information symbol is detected. Difference unit 1005 takes the difference between the outputs of the decision 1004 and selection 1003 devices, forming an error signal. The error signal from the difference unit 1005, as well as correlations from block 1001, are sent to an adaptive filter update computer 1006, which adaptively updates the FIR filter coefficients.

Although the foregoing exemplary embodiments present the signal processing in one order, those skilled in the art will recognize that the processing steps can be reordered, so that the correlation step follows the IIR or FIR filtering step, rather than before. Moreover, the real and imaginary parts of the filter tap coefficients can be restricted to values of $\pm 1$, $\pm \frac{1}{2}$, $\pm \frac{1}{4}$ ... and 0, as discussed in U.S. patent application Ser. No. 08/054,028 entitled "Quantized Coherent Rake Receiver" and filed on Apr. 29, 1993 which disclosure is incorporated here by reference. Also, when either the real or imaginary part of the tap coefficient is zero, the corresponding correlation does not need to be performed. An efficient way of performing only those correlations needed is discussed in U.S. Pat. No. 5,237,586 to Gregory E. Bottomley entitled "RAKE Receiver with Selective Ray Combining" which disclosure is incorporated here by reference. Finally, in all the exemplary embodiments disclosed herein, the filtering and selection operations may be combined into a single filtering operation per information symbol period.

The present invention can also be used in an enhanced CDMA system, in which coding is used to spread the sequence of data symbols into a sequence of code symbols. Typically, a group of data symbols, possibly already coded by some other code, are mapped into one of several possible code symbols. Each code symbol is usually represented as a sequence of binary values, called chips. These code symbols are then multiplied or scrambled with a known signature sequence. Bi-orthogonal and orthogonal codes, such as the Walsh-Hadamard codes, are commonly used to form the code symbol set. One example of an enhanced CDMA system, which also incorporates subtractive demodulation, is given in U.S. Pat. No. 5,218,619 to Paul W. Dent entitled "CDMA Subtractive Demodulation" which is also incorporated here by reference.

The present invention can also be applied when more than one channel is demodulated by the receiver. The channels may be demodulated in parallel, with shared coefficient computers or adaptive filter update computers. If the received dam are buffered, then successive demodulation is possible, possibly using a form of subtractive demodulation. If there is a pilot signal, it may be used to improve channel estimation, noise power estimation, as well as coefficient calculation.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A receiver comprising:

means for receiving a composite signal and producing complex samples of the received composite signal;

means for correlating said complex samples to a known sequence to generate correlation values;

means for selectively filtering said correlation values using filtering coefficients to produce filtered values, one filtered value for each symbol period, based on symbol timing information;

means for comparing said filtered values to potential symbol values to determine a detected data sequence; and means for computing the filtering coefficients of said selective filtering means to maximize a signal-to-noise ratio of said filtered values accounting for colored interference.

2. A receiver according to claim 1 in which said computing means determines said filtering coefficients based on estimates of channel tap coefficients and noise powers.

3. A receiver according to claim 1 in which said computing means determines said filtering coefficients using an adaptive filter algorithm.

4. A receiver according to claim 1 in which said selective filtering means is an infinite-impulse-response filter.

5. A receiver according to claim 1 in which said selective filtering means is a finite-impulse-response filter.

6. A receiver according to claim 1 wherein said computing means quantizes said filtering coefficients to a limited number of possible values.

7. A receiver according to claim 1 wherein said correlating means only correlates samples corresponding to a nonzero filtering coefficient.

8. A receiver according to claim 1 further comprising:

means for successively removing a detected signal from the composite signal to generate a residual composite signal for use in detecting other signals.

9. A receiver according to claim 1 in which said selectively filtering means comprises:

means for filtering said correlation values using filtering coefficients to produce a plurality of filtered values per symbol period; and means for selecting filtered values, one filtered value for each symbol period, based on symbol timing information.

10. The receiver of claim 1, wherein said means for selectively filtering further comprises:

means for selectively filtering said correlation values to select correlation values which do not correspond to an arrival of a signal echo.

11. A receiver comprising:

means for receiving a composite signal and producing complex samples of the received composite signal;

means for correlating said complex samples to a plurality of known sequences to generate a plurality of correlation values for each of the plurality of known sequences;

means for selectively filtering said correlation values using filtering coefficients to produce filtered values, one filtered value for each symbol period, for each known sequence based on symbol timing information;

means for comparing said filtered values to one another to determine a transmitted data sequence intended for the receiver; and means for computing the filtering coefficients of said selective filtering means to maximize a signal-to-noise ratio of said filtered values when said filtered values correspond to the transmitted sequence, accounting for colored interference.

12. A receiver according to claim 11, wherein said plurality of known sequences is an orthogonal code set.

13. A receiver according to claim 11 wherein said plurality of known sequences is a bi-orthogonal code set.

14. A receiver according to claim 11 wherein said correlating means further comprises:

means for descrambling said complex samples to produce descrambled values; and

Fast Walsh Transform means for correlating said descrambled values to possible Walsh-Hadamard code words.

15. A receiver according to claim 11 in which said selectively filtering means comprises:

means for filtering said correlation values using filtering coefficients to produce a plurality of filtered values per symbol period per sequence; and means for selecting filtered values, one filtered value for each symbol period, for each sequence, based on symbol timing information.

16. The receiver of claim 11, wherein said means for selectively filtering further comprises:

means for selectively filtering said correlation values to select correlation values which do not correspond to an arrival of a signal echo.

17. A method for receiving CDMA signals comprising the steps of:

receiving a composite signal and producing complex samples of the received composite signal;

correlating said samples to a known sequence to generate correlation values;

selectively filtering said correlation values using filtering coefficients to produce filtered values, one filtered value for each symbol period, based on symbol timing information;

comparing said filtered values to potential symbol values to determine a transmitted data sequence intended for the receiver; and computing the filtering coefficients of said selective filtering means to maximize a signal-to-noise ratio of said filtered values by accounting for colored interference.

18. The method of claim 17 further comprising the step of successively removing a detected signal from the composite signal to generate a residual composite signal for use in detecting other signals.

19. The method of claim 17, wherein said step of selectively filtering further comprises the step of:

selectively filtering said correlation values to select correlation values which do not correspond to an arrival of a signal echo.

20. A receiver comprising:

means for receiving a composite signal and producing complex samples of the received composite signal;

means for filtering said samples using filtering coefficients to produce filtered values;

means for selectively correlating said filtered values to a known sequence and generating correlation values, one correlation value for each symbol period, based on symbol timing information;

means for comparing said correlation values to potential symbol values to determine a transmitted data sequence intended for the receiver; and means for computing the filtering coefficients of said filtering means to maximize a signal-to-noise ratio of said correlation values by accounting for colored interference.

21. The receiver of claim 20, wherein said means for selectively correlating further comprises:

means for selecting correlation values which do not correspond to an arrival of a signal echo.

22. A receiver comprising:

means for receiving a signal to produce complex component samples of the received signal;

means for filtering said samples using filtering coefficients to produce filtered values;

means for selectively correlating said filtered values to a plurality of known sequences to generate a plurality of correlation values for each known sequence, one correlation value for each symbol period, based on symbol timing information;

means for comparing said correlation values to one another to determine a transmitted data sequence intended for the receiver; and means for computing the filtering coefficients of said filtering means to maximize a signal-to-noise ratio of said correlation values by accounting for colored interference, when said correlation values correspond to the transmitted sequence.

23. The receiver of claim 22, wherein said means for selectively correlating further comprises:

means for selecting correlation values which do not correspond to an arrival of a signal echo.

24. In a CDMA system downlink where at least one base station transmits at least one data sequence, a receiver comprising:

means for receiving a signal to produce complex samples of the received signal;

means for correlating said samples to a known sequence to generate correlation values;

means for selectively filtering said correlation values using filtering coefficients to produce filtered values, one filtered value for each symbol period, based on symbol timing information;

means for comparing said filtered values to potential symbol values to determine a detected data sequence; and means for computing the filtering coefficients of said selective filtering means to maximize a probability that said detected data sequence is equal to one of said at least one transmitted data sequence accounting for colored interference.

25. A receiver according to claim 24 in which said computing means determines said filtering coefficients based on estimates of channel tap coefficients for a plurality of base stations and noise power information.

26. The receiver of claim 24, wherein said means for selectively filtering further comprises:

means for selectively filtering said correlation values to select correlation values which do not correspond to an arrival of a signal echo.

27. In a CDMA system downlink where a plurality of base stations transmit at least one data sequence intended for the same receiver, a receiver comprising:

means for receiving a signal to produce complex samples of the received signal;

means for correlating said samples to a known sequence to generate correlation values;

means for selectively filtering said correlation values using filtering coefficients to produce filtered values, one filtered value for each symbol period, based on symbol timing information;

means for comparing said filtered values to potential symbol values to determine a detected data sequence; and means for computing the filtering coefficients of said selective filtering means to maximize a probability that said detected data sequence is equal to one of said at least one transmitted data sequence and taking into account colored interference.

28. The receiver of claim 27, wherein said means for selectively filtering further comprises:

means for selectively filtering said correlation values to select correlation values which do not correspond to an arrival of a signal echo.

29. A receiver comprising:

means for receiving a composite signal and producing complex samples of the received composite signal;

means for correlating said complex samples to a known sequence to generate correlation values;

means for selectively filtering said correlation values using filtering coefficients to produce filtered values, one filtered value for each symbol period, based on symbol timing information, wherein said filtered values are offset from an appearance of signal rays; and means for comparing said filtered values to potential symbol values to determine a detected data sequence.

* * * * *